1 PHR BUTYL STEARATE ADDED

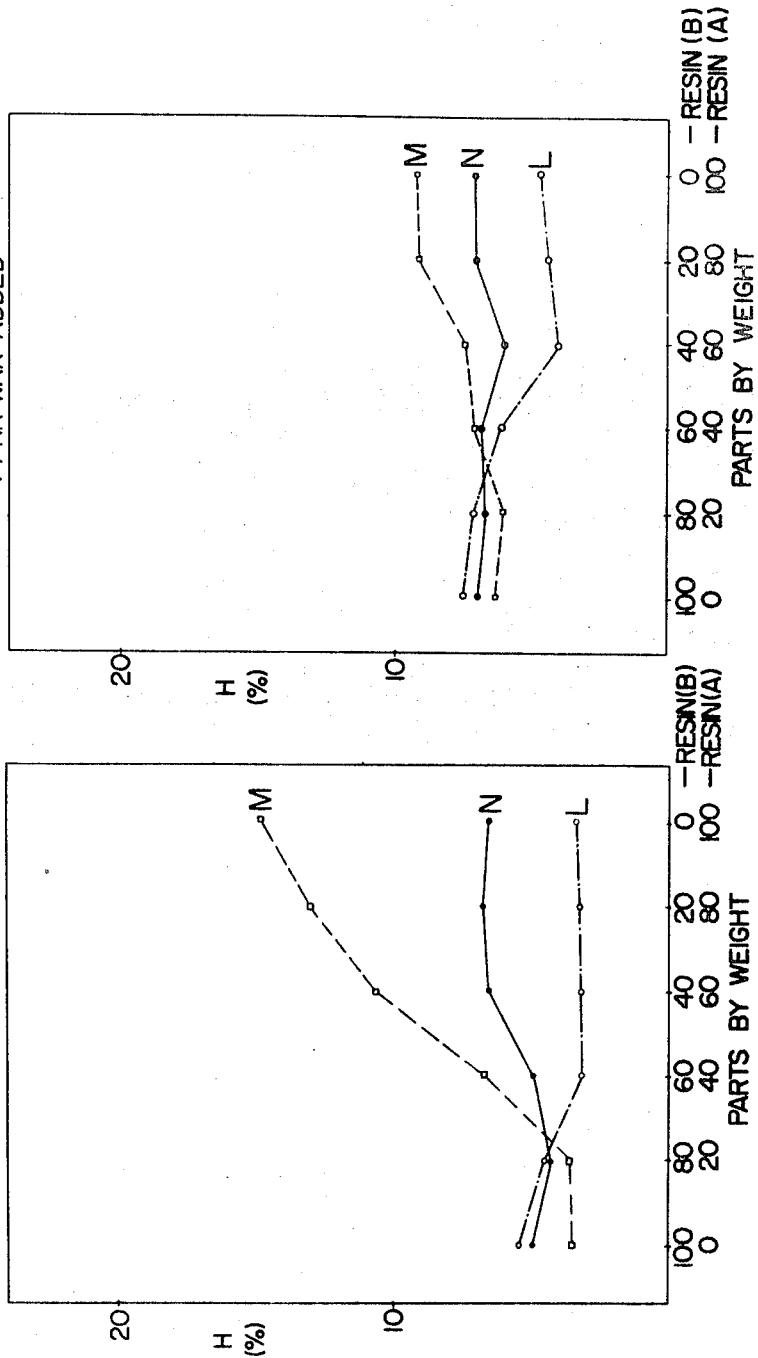

1 PHR KALCHOL 86 ADDED

TAKASHI TANAKA and
HARUHIKO YUSA,
INVENTORS

1 PHR LOXIOL GH-2 ADDED

1 PHR FLUID PARAFFIN ADDED

TAKASHI TANAKA and
HARUHIKO YUSA,
INVENTORS

United States Patent Office 3,657,390
Patented Apr. 18, 1972

3,657,390
POLYVINYL CHLORIDE RESIN COMPOSITION OF IMPROVED TRANSPARENCY AND IMPACT RESISTANCE AND PREPARATION THEREFOR
Takashi Tanaka and Haruhiko Yusa, Fukushima-ken, Japan, assignors to Kureha Kagaku Kogyo Kabushiki Kaisha, Chuo-ku, Tokyo-to, Japan
Filed Sept. 2, 1969, Ser. No. 854,402
Claims priority, application Japan, Aug. 31, 1968, 43/62,631
Int. Cl. C08f 29/24, 29/50, 29/56
U.S. Cl. 260—876 R
6 Claims

ABSTRACT OF THE DISCLOSURE

Polyvinyl chloride resin composition having excellent transparency and impact resistance prepared by mixing polyvinyl chloride resin with at least two kinds of graft-copolymers of butadiene-styrene-acrylic monomers, the one having a higher refractive index than that of the polyvinyl chloride and the other having a lower refractive index than that of the polyvinyl chloride, both graft-polymers being mixed at varying proportions depending on the kind and quantity of additive assistants.

BACKGROUND OF THE INVENTION

This invention is concerned with a colorless polyvinyl chloride (PVC) composition and a method for preparing the same. More particularly, the invention relates to polyvinyl chloride resin composition having improved transparency and impact strength obtained by mixing a polyvinyl chloride material with at least two kinds of graft copolymers consisting principally of butadiene, styrene and acrylic monomers (hereinafter called generally "ABS resins"), each having different refractive index.

It has heretofore been attempted to improve the impact resistant property of polyvinyl chloride by mixing it with an ABS resin such as a graft copolymer of butadiene-styrene-acrylonitrile (ABS), a graft copolymer of butadiene-styrene-methylmethacrylate (MBS), or the like. Especially, it has been known that, if the ABS (or MBS) resin having an adequate refractive index, good dispersibility in PVC, and other requisite properties is selectively mixed with polyvinyl chloride material, a PVC resin composition of good transparency and impact resistant property can be obtained.

As is well known, when processing polyvinyl chloride (PVC), there is required to use a heat stabilizer, plasticizer, lubricant, and other processing aids. In the case of the PVC resin composition, in which an ABS resin is mixed, the kind and mixing quantity of these processing agents greatly affect the color tone and transparency of the PVC resin composition.

Even in an ordinary processing of PVC material alone, the melt-extruded PVC resin assumes slight yellow, the color tone of which has been known to be varied depending on the kind and adding quantity of the processing agents. In this case, however, it is possible to turn this colored PVC to a colorless one by adding a small quantity of a blue pigment which is a complementary color to yellow, while it has been found difficult to adjust the color tone as well as transparency of the polyvinyl chloride mixed with an ABS resin by simply controlling the amount of blue pigment.

As a result of continuous studies and researches conducted by the inventors on the recipes for preparing a colorless, transparent PVC resin composition with ABS resin and auxiliary processing agents, it has been discovered to our surprise that colorless and transparent polyvinyl chloride resin composition could be obtained by using two kinds of ABS resins (A) and (B), the former being one having higher refractive index than that of PVC, and the latter having lower refractive index than that of PVC, wherein the mixing ratios of the two ABS resins (A) and (B) are properly adjusted in accordance with the kind and adding quantity of the auxiliary processing agents.

Although it has been a teachnical common sense in obtaining a transparent, high impact-resistant polyvinyl chloride resin composition to use ABS resins having the refractive index close to that of the polyvinyl chloride, it is surprising enough to find out that the PVC resin composition of highly improved colorless transparency could be obtained by using the ABS resin of different refractive index from that of PVC.

SUMMARY OF THE INVENTION

It is therefore an object of the present invention to provide a polyvinyl chloride resin composition of improved colorless transparency and impact-resistance which is composed of a polyvinyl chloride material and at least two kinds of ABS resins, one of which possesses higher refractive index than that of the polyvinyl chloride material and the other of which possesses lower refractive index than that of the polyvinyl chloride material.

It is another object of the present invention to provide a method for preparing the abovementioned PVC resin composition.

The nature, principle and objects of the present invention will become more apparent from the following detailed description of the present invention when read in conjunction with the accompanying drawing.

BRIEF DESCRIPTION OF THE DRAWING

In the drawing:

FIGS. 1 through 6 inclusive are the graphical representations showing the variations in the dullness of the PVC resin composition in accordance with mixing ratio of ABS resins (A) and (B) when a different kind of auxiliary agent is added to the respective PVC material.

DETAILED DESCRIPTION OF THE INVENTION

Figure 4:
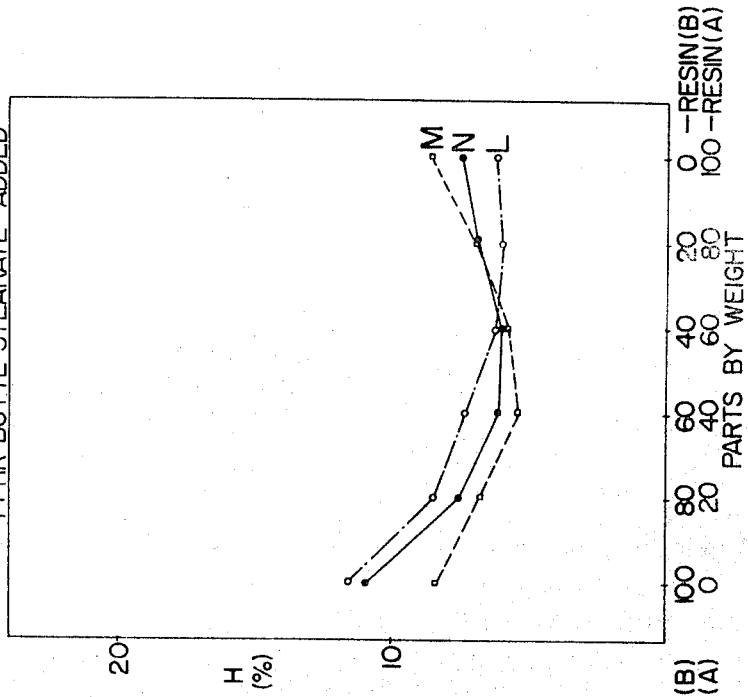

In principle, the impact resistance property to be imparted to the polyvinyl chloride by a rubbery plastic material such as ABS resins depends considerably on the proportion of the respective components constituting the ABS resins and the particle size of the copolymer dispersed in the polyvinyl chloride. At the same time, transparency and color tone of the PVC composition is also governed by these factors.

It is observed from an electron micro-photograph that, when a polyvinyl chloride resin composition containing ABS resins is kneaded by a roller, the graft copolymers do not become perfectly compatible with the polyvinyl chloride resin, but they are dispersed in the PVC resin in the form of minute particles of approximately 1000 angstroms. In such polyvinyl chloride in which the fine particles of the graft copolymers are dispersed, an incident light projected thereinto causes light scattering with the consequence that the degree of transparency of the resin is remarkably hindered.

In order therefore to remove the scattered light from the PVC resin composition containing ABS resins and to maintain the transparency thereof, the refractive index of both PVC and ABS resins should be made identical.

However, it is practically impossible to bring them into perfectly identical refractive index over the entire region of the visible light, because variations in the refractive index due to the wavelength of light are different in respect to each of the ABS resins and also the polyvinyl chloride. Accordingly, the wavelength of the scattered light in the polyvinyl chloride resin composition in which the ABS resins are finely dispersed becomes naturally varied depending on whether the refractive index of the ABS resins coincide with the refractive index of the PVC at the long wavelength side or at the short wavelength side. This causes difference in the tone of color to the naked eyes, and the greater the intensity of the scattered light becomes, the less becomes the degree of light transmission through the PVC resin composition.

Furthermore, as has already been stated in the foregoing, since the PVC resin compositions contains therein various kinds of auxiliary processing agents, the refactive index of the PVC and the ABS resins varies in a complicated fashion depending on their respective compatibility with these additives as well as the intrinsic refractive index thereof.

Of these auxiliary processing agents, the lubricants exert a remarkable influence on the refractive index of the ABS resins and PVC. When various kinds of lubricants are each added to the PVC resin composition mixed with definite quantities of the ABS resins, the color tone of the PVC resin composition turns variously into blue, yellow, transparent, etc. as shown in Example 1 which appear hereinafter, and the transparency thereof varies in accordance with the intensity of the scattered light accompanying the color tone. Thus, the optical property of the PVC resin composition containing the ABS resins, that is, the color tone and transparency thereof, is variable depending on the light scattered in the dispersion system of the PVC resin composition, hence it is not at all possible to improve such optical property by simply using coloring agents such as pigments.

According to the present invention, however, at least two kinds of ABS resins each having a different composition and being adjusted in such a manner that the refractive index thereof differs to some extent one from the other are mixed at an appropriate mixing ratio with the polyvinyl chloride material, whereby it becomes possible to reduce the light scatter to the minimum degree and to maintain high transparency in the shaped articles of the PVC resin composition.

For the ABS resins to be used in the present invention, there are graft copolymers composed of butadiene, styrene, and acrylic monomers such as acrylonitrile, methylmethacrylate, ethylmethacrylate, methylacrylate, ethylacrylate, etc., in which homopolymer of butadiene or a copolymer of butadiene with other components is graft-copolymerized with other necessary components. Examples of such graft-copolymers are: butadiene-styrene-acrylonitrile graft - copolymer; butadiene - styrene methylmethacrylate graft-copolymer; butadiene-styrene-acrylonitrile-methylmethylacrylate graft-copolymer; butadiene-styrene-acrylonitrile-ethylacrylate graft-copolymer; and so forth. In some cases, there can be also used what is considered substantially a butadiene-styrene-acrylic monomer resin containing less than 10% of other copolymerizable monomer component besides the abovementioned monomer component. These ABS resins can be manufactured by various known methods such as those disclosed in U.S. Pat. Nos. 2,943,074 and 3,163,683, British Pat. Nos. 844,325 and 858,776, and French Pat. No. 1,488,805, and others.

The refractive index of the ABS resins is determined by the composition of monomers they contain, wherein addition of varying proportion of monomer components having respectively different refractive index governs the final refractive index of a resultant graft copolymer. For instance, in graft-copolymer consisting of butadiene, styrene, and methylmethacrylate, the refractive indexes ($n_D^{25}$) of which are 1.515, 1.590, and 1.494, respectively, the final refractive index of the MBS resin containing 50% by weight of butadiene, 30% by weight of styrene, and 20% by weight of methylmethacrylate is 1.538 by actual measurement and 1.537 by calculation, both figures coinciding substantially.

Since the refractive index ($n_D^{25}$) of polyvinyl chloride is 1.537 to 1.541, thhough there is slight difference according to the grades of PVC, it is desirable to use a ABS resin (A) having the refractive index of from 1.538 to 1.548 and the ABS resin (B) having a refractive index of from 1.530 to 1.541. When the difference in the Refractive Index between the ABS resins (A) and (B) is too small, the adjustment of the color tone according to the present invention becomes difficult. Therefore, the difference in the refractive index between (A) and (B) had better be more than 0.002.

PREFERRED EMBODIMENTS OF INVENTION

In order to induce persons skilled in the art to possible reduction into practice of the present invention, the following actual examples are presented.

For these examples, two kinds of the undermentioned MBS resin (A) and (B) are used.

(a) MBS resin (A) having a refractive index of 1.543 and composed of butadiene, styrene, and methylmethacrylate at the ratio of 46:38:16 and further containing 0.5% divinyl benzene. This resin is prepared by graft-copolymerizing 400 parts by weight of rubber latex consisting of 76.5% butadiene, 23% styrene, and 0.5% divinyl benzene, and having a resin concentration of 25% by weight; 40 parts by weight of styrene; 26 parts by weight of methylmethacrylate; and 0.26 part by weight of divinyl benzene.

(b) MBS resin (B) having a refractive index of 1.538 and composed of butadiene, styrene, methylmethacrylate at the ratio of 50:31:19 and further containing 0.5% divinyl benzene. This resin is prepared by graft-copolymerizing 400 parts by weight of the rubber latex as in the MBS resin (A); 25 parts by weight of styrene; 29 parts by weight of methylmethacrylate; and 0.2 parts by weight of divinyl benzene.

EXAMPLE 1

13 parts by weight of a mixture of the MBS resins (A) and (B) at mixing ratios as shown in Table 1 below, and 87 parts by weight of polyvinyl chloride (degree of polymerization=800) containing 2 parts by weight of dibutyltin laurate and 1 part by weight of the various lubricants are mixed and kneaded at a temperature of 160° C. for 3 minotes by means of a roll mill, after which the kneaded mixture is pressed under pressure of 150 kg./cm.² at 200° C. for 5 minutes to be formed into plates of 3 mm. thick. These plates are subjected to measurement, based on the Japan Industrial Standard JIS K-6714, for the transparency (TPN percent and the dullness (H percent) by means of three kinds of filters L, M, and N and corresponding light sources having different wavelengths, i.e., L=yellow light of $\lambda_{max}$ 585 m$\mu$. M=bluish-purple light of $\lambda_{max}$ 533 m$\mu$, and N=standard light of $\lambda$340 to 600 m$\mu$, as well as to observation by naked eyes for color tone.

Further, by the same procedure, a plate of 6 mm. thick is prepared and tested for V-notch Izod impact strength. The test results are shown in Table 2 below. As will be clear from Tables 1 and 2, use of a mixture of the MBS resins (A) and (B) of an appropriate proportion makes it possible to manufacture PVC resin shaped articles having excellent transparency and impact strength without being affected by the kind of lubricants to be added thereto.

Figure 3:
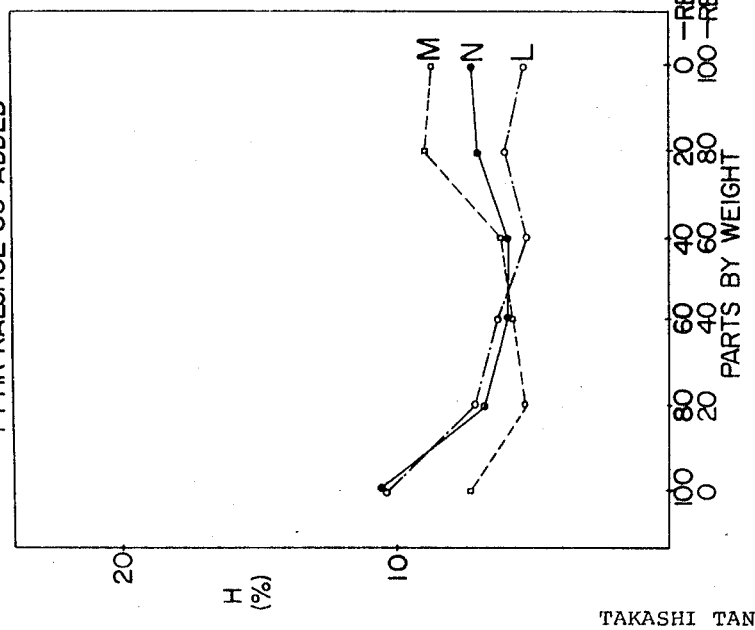
Figure 6:
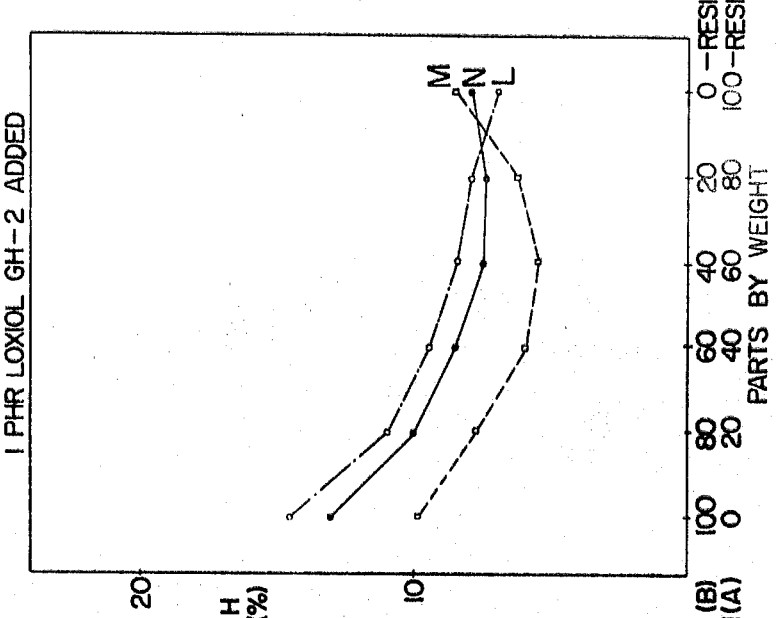
Figure 5:
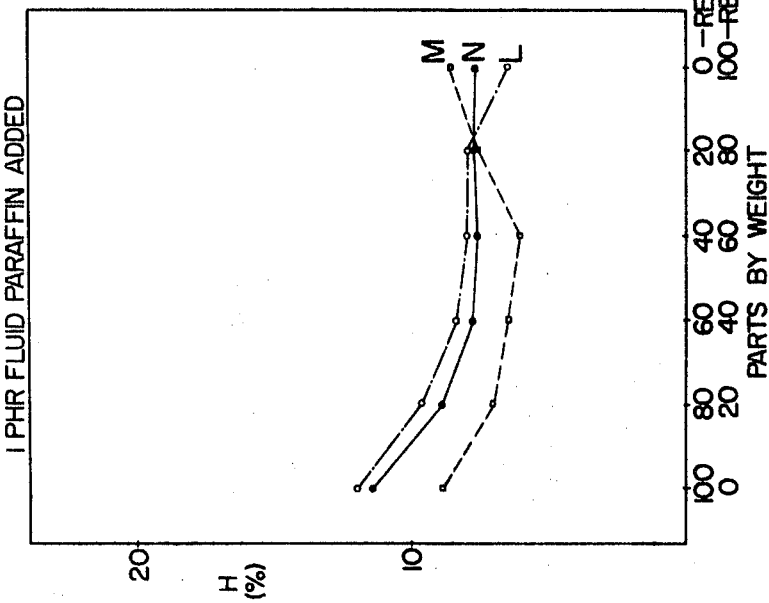

The graphical representations in FIGS. 1 to 6 are respectively prepared on the basis of the data in Table 1 for each additive lubricant, and show variations in the dullness ($H_L$, $H_M$, $H_N$) depending on the mixing ratio of the resins (A) and (B) in case various lubricants are added. Transparent PVC plates can be obtained at the mixing ratio of the resins (A) and (B) where the values of $H_L$ and $H_M$ substantially coincide.

of dibutyltin laurate and 1 part by weight of various lubricants are mixed and kneaded in the same manner as in the above Example 1, and then the kneaded mixture is shaped into plates. Transparent PVC resin plates can be obtained without exception even when the lubricant to be added varies from one kind to another with varying mix- TABLE 1.—COLOR TONE AND TRANSPARENCY OF PVC RESIN SHAPED ARTICLES DEPENDING ON MIXING RATIO OF MBS RESINS (A) AND (B)

| Mixing ratio of (A)/(B) (part by weight) | Transparency, dullness and color tone | Lubricant added | | | | | |
|---|---|---|---|---|---|---|---|
| | | No additive | Hoechst Wax E | Kalchol-86 | Butyl stearate | Fluid paraffin | Loxiol GH-2 |
| 100/0 | TPN, percent | 77.0 | 78.9 | 77.0 | 77.0 | 76.0 | 76.0 |
| | $H_L$, percent | 3.4 | 4.6 | 5.3 | 6.2 | 6.5 | 6.9 |
| | $H_M$, percent | 14.4 | 9.2 | 8.7 | 8.6 | 8.6 | 8.5 |
| | $H_N$, percent | 6.9 | 7.1 | 7.2 | 7.5 | 7.7 | 7.9 |
| | Color tone | (¹) | Blue | (²) | (²) | (³) | (⁴) |
| 80/20 | TPN, percent | 77.6 | 74.4 | 75.3 | 75.3 | 76.4 | 75.3 |
| | $H_L$, percent | 3.2 | 4.4 | 6.0 | 6.0 | 8.0 | 7.9 |
| | $H_M$, percent | 13.0 | 9.1 | 8.9 | 7.0 | 7.7 | 6.2 |
| | $H_N$, percent | 6.9 | 7.0 | 7.0 | 7.0 | 7.7 | 7.3 |
| | Color tone | (¹) | Blue | (²) | (⁴) | (⁴) | (⁴) |
| 60/40 | TPN, percent | 78.7 | 75.6 | 75.6 | 74.8 | 75.5 | 74.8 |
| | $H_L$, percent | 3.2 | 4.0 | 5.2 | 6.2 | 8.0 | 8.4 |
| | $H_M$, percent | 10.7 | 7.5 | 6.1 | 5.9 | 6.0 | 5.5 |
| | $H_N$, percent | 6.5 | 6.0 | 5.9 | 6.0 | 7.8 | 7.5 |
| | Color tone | Blue | (⁵) | (⁴) | (⁴) | (⁶) | (⁷) |
| 40/60 | TPN, percent | 80.4 | 75.4 | 74.4 | 76.4 | 72.0 | 70.3 |
| | $H_L$, percent | 3.2 | 6.1 | 6.2 | 7.3 | 8.4 | 9.5 |
| | $H_M$, percent | 6.7 | 7.0 | 5.8 | 6.5 | 5.4 | 6.0 |
| | $H_N$, percent | 4.9 | 6.9 | 5.8 | 7.1 | 7.8 | 8.5 |
| | Color tone | (⁵) | (⁴) | (⁴) | (⁶) | (⁷) | (⁷) |
| 20/80 | TPN, percent | 80.7 | 77.4 | 75.4 | 75.0 | 72.0 | 69.7 |
| | $H_L$, percent | 4.5 | 7.0 | 7.1 | 8.5 | 9.7 | 11.0 |
| | $H_M$, percent | 3.6 | 6.0 | 5.3 | 6.7 | 7.0 | 7.8 |
| | $H_N$, percent | 4.4 | 6.7 | 6.8 | 7.5 | 9.0 | 10.0 |
| | Color tone | (⁴) | (⁴) | (⁶) | (⁷) | (⁷) | Yellow |
| 0/100 | TPN, percent | 80.5 | 72.6 | 71.4 | 69.5 | 68.5 | 67.3 |
| | $H_L$, percent | 5.4 | 9.6 | 10.4 | 11.5 | 12.0 | 14.5 |
| | $H_M$, percent | 3.5 | 5.8 | 7.3 | 8.4 | 8.9 | 9.9 |
| | $H_N$, percent | 5.0 | 8.8 | 10.6 | 11.0 | 11.5 | 13.0 |
| | Color tone | (⁴) | (⁴) | (⁷) | Yellow | (⁸) | (⁸) |

NOTE.—Hoechst Wax E=A trademark for an ester system lubricant manufactured by Hoechst Japan Ltd; Kalchol-86=A trademark for an aliphatic alcohol system lubricant manufactured by Kao Soap Co., Japan. Loxiol GH-2=A trademark for a lubricant manufactured by Oscar-Neynabar, Germany (composition unknown).
¹ Striking blue. ² Weak purple. ³ Weakest purple. ⁴ Nearly colorless. ⁵ Weak blue. ⁶ Weakest yellow. ⁷ Weak yellow. ⁸ Striking yellow.

TABLE 2.—VARIATIONS IN IMPACT STRENGTH OF PVC RESIN SHAPED ARTICLES DEPENDING ON VARYING MIXING RATIO OF MBS RESINS (A) AND (B)

V-notch Izod impact strength, kg./cm.²
Kneading temperature −160° C.

| Lubricants added | (A)/(B), parts by weight | | | | | |
|---|---|---|---|---|---|---|
| | 100/0 | 80/20 | 60/40 | 40/60 | 20/80 | 0/100 |
| No additive | 75 | 73 | 75 | 74 | 72 | 80 |
| Hoechst Wax E | 78 | 77 | 70 | 75 | 77 | 76 |
| Kalchol-86 | 77 | 74 | 76 | 75 | 78 | 78 |
| Butyl stearate | 75 | 76 | 77 | 75 | 80 | 82 |
| Fluid paraffin | 77 | 74 | 73 | 75 | 82 | 80 |
| Loxiol GH-2 | 80 | 78 | 80 | 80 | 83 | 85 |

(A)+(B)=13 parts by weight

EXAMPLE 2

Mixture monomers of styrene and acrylontrile are graft-polymerized on the rubber latex used at the time of manufacturing the MBS resin (A) in Example 1, from which an ABS resin (A′) consisting of 50% by weight monomer of butadiene, 38% by weight monomer of styrene, and 12% by weight monomer of acrylonitrile, and an ABS resin (B′) consisting of 50% by weight monomer of butadiene, 23% by weight monomer of styrene, and 27% by weight monomer of acrylonitrile are prepared. The refractive indexes of the respective ABS resins are 1.544 for (A′) and 1.534 for (B′).

13 parts by weight of the ABS resins (A′) and (B′) at an arbitrary mixing ratio, and 87 parts by weight of polyvinyl chloride (D.P. 800) containing 2 parts by weight ing proportion of the ABS resins (A′) and (B′), as shown in the following Table 3.

TABLE 3

| Lubricants | (A′)/(B′) parts by weight | Transparency |
|---|---|---|
| No additive | 0/100 | Colorless and transparent. |
| Hoechst wax E | 20/80 | Do. |
| Kalchol-86 | 30/70 | Do. |
| Butyl stearate | 50/50 | Do. |
| Fluid paraffin | 80/20 | Do. |
| Loxiol GH-2 | 90/10 | Do. |

EXAMPLE 3 (Comparative example)

13 parts by weight of the MBS resin (A), or 13 parts by weight of the MBS resin (B), and 87 parts by weight of polyvinyl chloride (D.P. 800 and $n_D^{25}$=1.540) containing therein 2 parts by weight of dibutyltine laurate and 1 part by weight of any one of various lubricants, are mixed and kneaded by a roll mill at a temperature of 160° C. for 3 minutes, after which the kneaded mixture is pressed under pressure of 150 kg./cm.² for 5 minutes to form PVC resin plates of 3 mm. thick. The plates thus obtained are subjected to measurement, based on the Japan Industrial Standard JIS K-6714, for the transparency (TPN percent) due to a standard light and the dullness (H%) by using three kinds of filters L, M, and N and corresponding three light sources having different wave-lengths, i.e., L=yellow light of $\lambda_{max}$ 585 m$\mu$, M=blue-purple light of $\lambda_{max}$ 433 m$\mu$, and N=standard light of $\lambda$340 to 600 m$\mu$.

When the value $H_M$ is greater than $H_L$, the tone of color observed by naked eyes assumes bluish tone, and when the value $H_L$ is greater than $H_M$, the color tone becomes yellowish. Transparency of the shaped article can be attained at a point where the values of $H_M$ and $H_L$ substantially coincide.

The following Tables 4 and 5 respectively indicate transparency and variations in color tone of PVC resin plates depending on the kinds of additive lubricants when the PVC resin composition is mixed with any one of the ABS resins (A) and (B).

TABLE 4.—ABS RESIN (A) ALONE ADDED

| Lubricant | Light penetration factor TPN (percent) | Dullness (percent) | | | Color tone |
|---|---|---|---|---|---|
| | | $H_L$ | $H_M$ | $H_N$ | |
| No addition | 77.0 | 3.4 | 14.4 | 6.9 | Striking blue. |
| Hoechst Wax E | 78.9 | 4.6 | 9.2 | 7.1 | Blue. |
| Kalchol-86 | 77.0 | 5.3 | 8.7 | 7.2 | Weak purple. |
| Butyl stearate | 77.0 | 6.2 | 8.6 | 7.5 | Nearly colorless. |
| Fluid paraffin | 76.0 | 6.5 | 8.6 | 7.7 | Do. |
| Loxiol GH-2 | 76.0 | 6.9 | 8.5 | 7.9 | Do. |

NOTE.—The dullness under the respective light sources is calculated by the following equation.

$$H, \text{percent} = \frac{\text{Quantity of scattered light}}{\text{Total quantity of transmitted light}} \times 100$$

TABLE 5.—ABS RESIN (B) ALONE ADDED

| Lubricant | Transparency TPN (percent) | Dullness (percent) | | | Color tone |
|---|---|---|---|---|---|
| | | $H_L$ | $H_M$ | $H_N$ | |
| No addition | 80.5 | 5.4 | 3.5 | 5.0 | Transparent. |
| Hoechst Wax E | 72.6 | 7.6 | 6.4 | 7.0 | Nearly colorless. |
| Kalchol-86 | 71.4 | 10.4 | 7.3 | 10.6 | Weak yellow. |
| Butyl stearate | 69.5 | 11.5 | 8.4 | 11.0 | Yellow. |
| Fluid paraffin | 68.5 | 12.0 | 8.9 | 11.5 | Striking yellow. |
| Loxiol GH-2 | 67.3 | 14.5 | 9.9 | 13.0 | Do. |

From the above tables, it will be observed that, in the case of the ABS resin (A) alone, the color tone ranges from striking blue to transparency, and, in the case of the ABS resin (B) alone, the color tone widely varies from transparency to striking blue. This would prove that, with either (A) or (B) alone, it is not possible to produce transparent PVC resin articles no matter how the mixing proportions of PVC and the resin (A) or (B) are varied.

What we claim is:

1. A polyvinyl chloride resin composition of improved colorless transparency and impact resistance which consists of at least 87 parts by weight of polyvinyl chloride having a degree of polymerization of 800, and 13 parts by weight of a mixture of a first graft-copolymer composed of a butadiene styrene, and an acrylic monomer having a refractive index of 1.538 to 1.548, and a second different graft-copolymer composed of butadiene, styrene, and an acrylic monomer having a refractive index of 1.530 to 1.541, said first graft-copolymer having a refractive index higher than that of said polyvinyl chloride and said second graft-copolymer having a refractive index lower than that of said polyvinyl chloride.

2. Composition according to claim 1, wherein the mixing ratio of said first and second graft-copolymers ranges from 90:10 parts by weight to 10:90 parts by weight.

3. Preparation of a polyvinyl chloride resin composition of improved colorless transparency and impact-resistance which comprises mixing and kneading a polyvinyl chloride resin with a mixture of a first graft-copolymer of a butadiene-styrene-acrylic monomer having a refractive index of 1.538 to 1.548 and a second different graft-copolymer of a butadiene-styrene-acrylic monomer having a refractive index of 1.530 to 1.541, said first graft-copolymer having a refractive index higher than that of said polyvinyl chloride and said second graft-copolymer having a refractive index lower than that of said polyvinyl chloride.

4. Process according to claim 3, in which the difference in the refractive index between said first and second graft-copolymers is at least 0.002.

5. Process according to claim 3, in which the mixing proportion of said first and second graft-copolymer ranges from 90:10 to 10:90.

6. Process according to claim 3, in which said graft-copolymer is one selected from a group consisting of butadiene-styrene-acrylonitrile graft - copolymer, butadiene-styrene-methylmethacrylate graft-copolymer, butadiene-styrene-acrylonitrile-methylmethacrylate graft-copolymer, and butadiene-styrene-acrylonitrile-ethylacrylate graft-copolymer.

References Cited
UNITED STATES PATENTS 3,406,136   10/1968   Scarso et al. _____ 260—876

FOREIGN PATENTS 994,924   6/1965   Great Britain _____ 260—876
893,084   4/1962   Great Britain _____ 260—880

SAMUEL H. BLECH, Primary Examiner

U.S. Cl. X.R.

260—23.7 H, 28.5 D, 31.2 R, 33.4 R, 33.6 UA